United States Patent [19]

Hanak et al.

[11] Patent Number: 4,636,579
[45] Date of Patent: Jan. 13, 1987

[54] RETRACTABLE POWER SUPPLY

[75] Inventors: Joseph J. Hanak, Birmingham; James Young, West Bloomfield; Bert Kuypers, Lake Orion; Richard Blieden, Bloomfield Hills, all of Mich.

[73] Assignee: Energy Conversion Devices, Inc., Troy, Mich.

[21] Appl. No.: 712,838

[22] Filed: Mar. 18, 1985

[51] Int. Cl.⁴ .................................... H01L 31/06
[52] U.S. Cl. ............................ 136/245; 136/246; 136/291
[58] Field of Search ................ 136/245, 246, 291

[56] References Cited

U.S. PATENT DOCUMENTS 3,411,050 11/1968 Middleton et al. ............... 136/245
3,778,312 12/1973 Karius ................................ 136/245
4,293,731 10/1981 Schweig et al. ................... 136/245
4,539,516 9/1985 Thompson ......................... 320/48

FOREIGN PATENT DOCUMENTS 60-43870 3/1985 Japan ................................. 136/245

Primary Examiner—Aaron Weisstuch
Attorney, Agent, or Firm—Marvin S. Siskind; Ronald W. Citkowski

[57] ABSTRACT

A retractable power supply including a solar cell for converting incident radiation to electrical energy and a base member for (1) storing the solar cell when said cell is not operatively deployed and (2) supporting the solar cell when said cell is in an operative condition. A rechargeable battery pack may be included in the base member for storing electrical energy generated by the solar cell. In one particularly noteworthy embodiment, the solar cell may be employed as a retractable window shade.

16 Claims, 4 Drawing Figures

RETRACTABLE POWER SUPPLY

FIELD OF THE INVENTION

This invention relates generally to photovoltaic devices and more particularly to a retractable, portable power supply which includes an ultra-thin, flexible, ultralight large area solar cell.

BACKGROUND OF THE INVENTION

Due to Applicants' development of a method for the fabrication of flexible, ultra-thin, ultralight substrates, solar cells may now be manufactured by depositing layers of thin film semiconductor alloy material thereupon. Such solar cells are noteworthy in that they exhibit (1) increased operational reliability, (2) increased operational efficiency, (3) increased yields, and (4) have a markedly reduced number of surface defects. Additionally, the solar cells, so produced, are correspondingly thin, lightweight, flexible, and rollable. The solar cells are thereby susceptible to a host of novel applications not previously possible with crystalline solar cells.

Single crystal photovoltaic devices, especially crystalline silicon photovoltaic devices have been utilized for some time as sources of electrical power because they are inherently non-polluting, silent and consume no expendable natural resources in their operation. However, the utility of such devices is limited by problems associated with both the manufacturing and the inherent physical constraints thereof. More particularly, single crystal materials (1) are difficult to produce in sizes substantially larger than several inches in diameter, (2) are thicker and heavier than their amorphous counterparts; and (3) are expensive and time consuming to fabricate.

Recently, considerable efforts have been made to develop systems for depositing amorphous semiconductor materials, each of which can encompass relatively large areas, and which can be doped to form p-type and n-type materials for the production of p-i-n type photovoltaic devices which are, in operation, substantially equivalent to their crystalline counterparts. It is to be noted that the term "amorphous", as used herein, includes all materials or alloys which have no long range order, although they may have short or intermediate range order or even contain, at times, crystalline inclusions.

Unlike crystalline silicon which is limited to batch processing for the manufacture of solar cells, amorphous silicon alloys can be deposited in multiple layers over large area substrates to form solar cells in a high volume, continuous processing system. It is now possible to continuously prepare amorphous silicon alloys by glow discharge or vacuum deposition techniques, said alloys possessing (1) acceptable concentrations of localized defect states in the energy gaps thereof, and (2) high quality electrical and optical properties. Fluorine introduced into the amorphous silicon semiconductor layers operates to substantially reduce the density of the localized defect states therein and facilitates the addition of other alloying materials, such as germanium.

As disclosed in previous patents of Applicants' assignee, a substrate may be continuously advanced through a succession of deposition chambers, wherein each chamber is dedicated to the deposition of a specific layer of semiconductor alloy material. In making a photovoltaic device of p-i-n type configurations, the first chamber is dedicated for depositing a p-type semiconductor alloy, the second chamber is dedicated for depositing an intrinsic amorphous semiconductor alloy, and the third chamber is dedicated for depositing an n-type semiconductor alloy. Since each deposited semiconductor alloy, and especially the intrinsic semiconductor alloy, must be of high purity, every possible precaution is taken to insure that the sanctity of the vacuum envelope formed by the various chambers of the deposition apparatus remains uncontaminated by impurities, regardless of origin.

The instant patent application relates to specific applications to which such mass-produced, ultrathin, ultralight, flexible solar cells may be put. These uses as well as further objects and advantages of the instant invention will become apparent from the following description of the preferred embodiments, when that description is taken in combination with the accompanying drawings and claims.

BRIEF SUMMARY OF THE INVENTION

There is disclosed herein a retractable power supply which includes (1) a thin, flexible, lightweight large area solar cell for converting incident radiation to electrical energy, (2) a base member for storing the solar cell and (3) a terminal for withdrawing electrical energy from the power supply. The base member may be shaped as a hollow canister (1) about which the solar cell is retractably wound and from which the solar cell is unfurled, or (2) the solar cell may be retracted into and unfurled from the interior of that hollow canister. In either event, the solar cell is an elongated member which includes metal, tape-like strips affixed to the opposed longitudinal, peripheral edges thereof. A sleeve covers the peripheral border of the transverse edge of the solar cell, i.e., that transverse edge which is not secured to the base member. The sleeve may include one or more apertures or snaps for hanging the power supply from a wall or other support. In a preferred embodiment, the hollow canister has a plurality of rechargeable batteries stored therewithin, which batteries are operatively connected to the solar cell for the purpose of charging same. The canister may further include an inverter for converting the direct current produced by the cell to alternating current. The power supply may further include a partially, cylindrically-shaped support frame in which the cylindrically-shaped base member is rotatably supported. The periphery of the canister and the interior, cylindrically-shaped surface of the support frame may include a plurality of correspondingly shaped detents for positioning the unfurled solar cell at any given angle relative to incident solar radiation. In a modified embodiment of the invention, the base member of the power supply is adapted to be hung from a window so that the solar cell portion thereof may function as a combination window shade/solar cell.

DETAILED DESCRIPTION OF THE DRAWINGS

I. The Photovoltaic Cell

Figure 1:
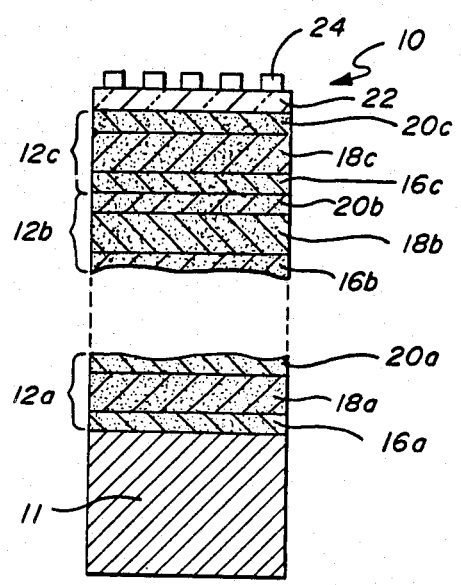
FIG. 1 is a fragmentary, cross-sectional view of a tandem photovoltaic device comprising a plurality of p-i-n type cells, each layer of the cells formed from a semiconductor alloy.

Referring now to the remainder of the drawings and particularly to FIG. 1, a photovoltaic cell, formed of a plurality of successive p-i-n layers, each layer of which includes, in the preferred embodiment, a substantially amorphous semiconductor alloy, is shown generally by the reference numeral 10. It is this type of photovoltaic device, wherein successive uniform, homogeneous, substantially amorphous semiconductor alloy layers are continuously deposited onto a substrate from which the retractible power supply of the present invention was developed.

More particularly, FIG. 1 shows a p-i-n-type photovoltaic device, such as a solar cell, fabricated from a plurality of stacked, individual p-i-n-type cells, such as cells 12a, 12b, and 12c. Below the lowermost cell 12a is a substrate 11 which may be transparent and formed from a synthetic plastic resin or glass coated with an electrically conductive film; or opaque and formed from a metallic material such as stainless steel, nickel, aluminum, tantalum, molybdenum, or chrome. Although certain applications may require a thin oxide layer and/or a series of base contacts prior to the application of the substantially amorphous semiconductor alloy material, for purposes of this application, the term "substrate" shall include not only a flexible film, but also any elements added thereto by preliminary processing.

Each of the cells 12a, 12b, and 12c is fabricated with a substantially amorphous alloy body containing at least a silicon alloy. Each of the alloy bodies includes an n-type conductivity region or layer 20a, 20b, or 20c; an intrinsic region or layer 18a, 18b, or 18c; and a p-type conductivity region or layer 16a, 16b, or 16c. As illustrated, cell 12b is an intermediate cell and, as indicated in FIG. 1, additional intermediate cells may be stacked along with the illustrated cells without departing from the spirit or scope of the present invention. Also, although p-i-n solar cells are illustrated, the retractable power supply of this invention includes solar cells which may also be formed as single or multiple n-i-p cells.

It is to be understood that following the deposition of the layers of semiconductor alloy material, a further deposition process may be either performed in a separate environment or as a part of the continuous process. In this step, a TCO (transparent conductive oxide) layer 22, such as indium tin oxide, is deposited atop the exposed layer of semiconductor alloy material of the uppermost cell. Further, an electrode grid 24 may be added to the device where the cell is of sufficiently large surface area, or if the electrical conductivity of the TCO layer 22 is insufficient. The grid 24 shortens the carrier path and increases the photovoltaic conduction efficiency of the photovoltaic device 10.

II. The Retractable Power Supply

Figure 2:
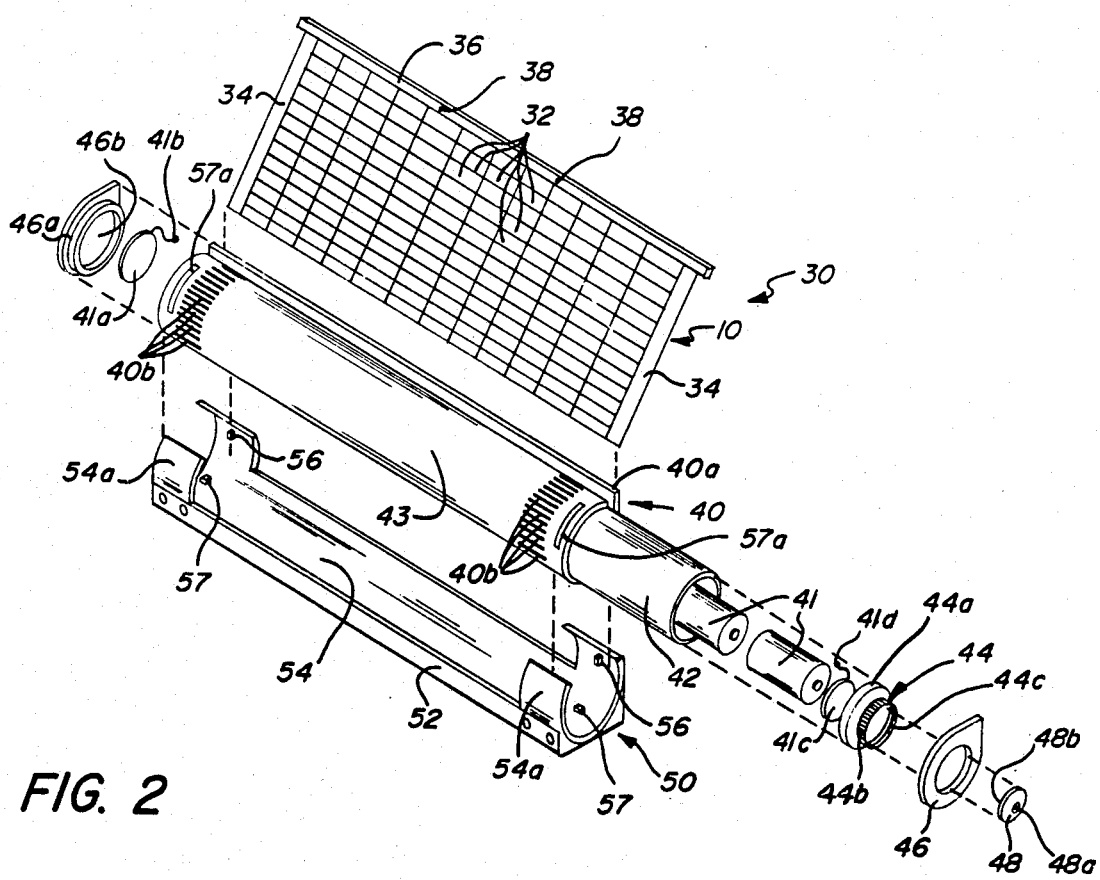
FIG. 2 is an exploded perspective view of the retractable power supply assembly of the instant invention, said assembly including a rechargeable battery pack.
Figure 3:
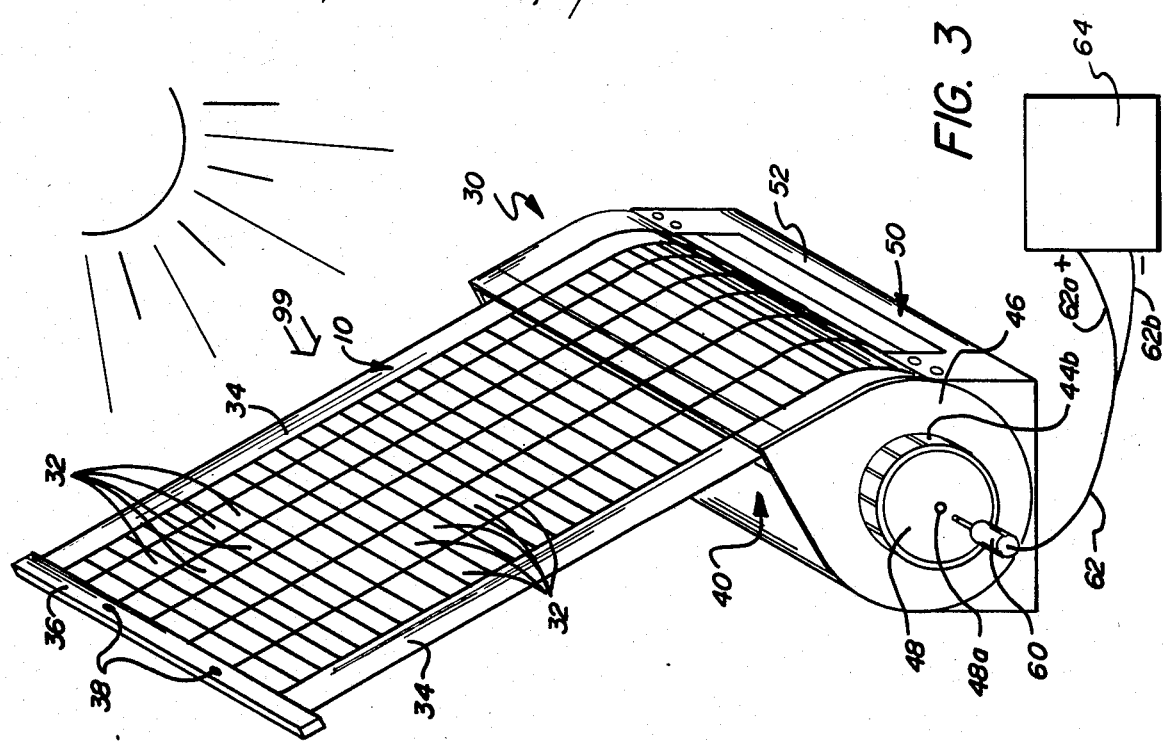
FIG. 3 is an elongated perspective view of the retractable power supply assembly of FIG. 2 as operatively disposed at an appropriate angle to capture a maximum amount of incident solar radiation.

Turning now to FIGS. 2-3, a first preferred embodiment of the retractable power supply of the instant application is shown generally by the reference numeral 30. The power supply 30 includes the following major components, each of which will be discussed in detail in the following paragraphs: an elongated, flexible, ultralight, large area solar cell 10; a base member 40; and a support frame 50.

The solar cell 10 is of the type, both compositionally and structurally, referred to and described hereinabove with reference to FIG. 1. In other words, the solar cell 10 preferably includes a plurality of stacked cells, such as 12a, 12b, and 12c, the respective current outputs of which have been substantially matched so that the voltage outputs thereof become the sum of the output of each individual cell. It should, however, be noted that the substrate 11, upon which the multiple layers of semiconductor alloy material comprising the stacked cells are deposited, is preferably of the type which Applicants have descriptively dubbed "ultralight". Applicants' ultralight, large area solar cells 10 have been fully disclosed in U.S. Pat. No. 4,530,739, assigned to the assignee of the instant invention and the disclosure of which is fully incorporated herein by reference. As utilized herein, the term "large area" will refer to a solar cell of sufficiently large area that subdivision thereof is necessary in order to efficiently and practically use that cell. For example, the large area solar cells described herein are subdivided into a plurality of small area segments 32 in order to more efficiently collect photogenerated current, to allow for electrical interconnection of the subdivided small area segments into preselected series and/or parallel connected arrays, and to obviate problems associated with defects in those small area segments.

Figure 4:
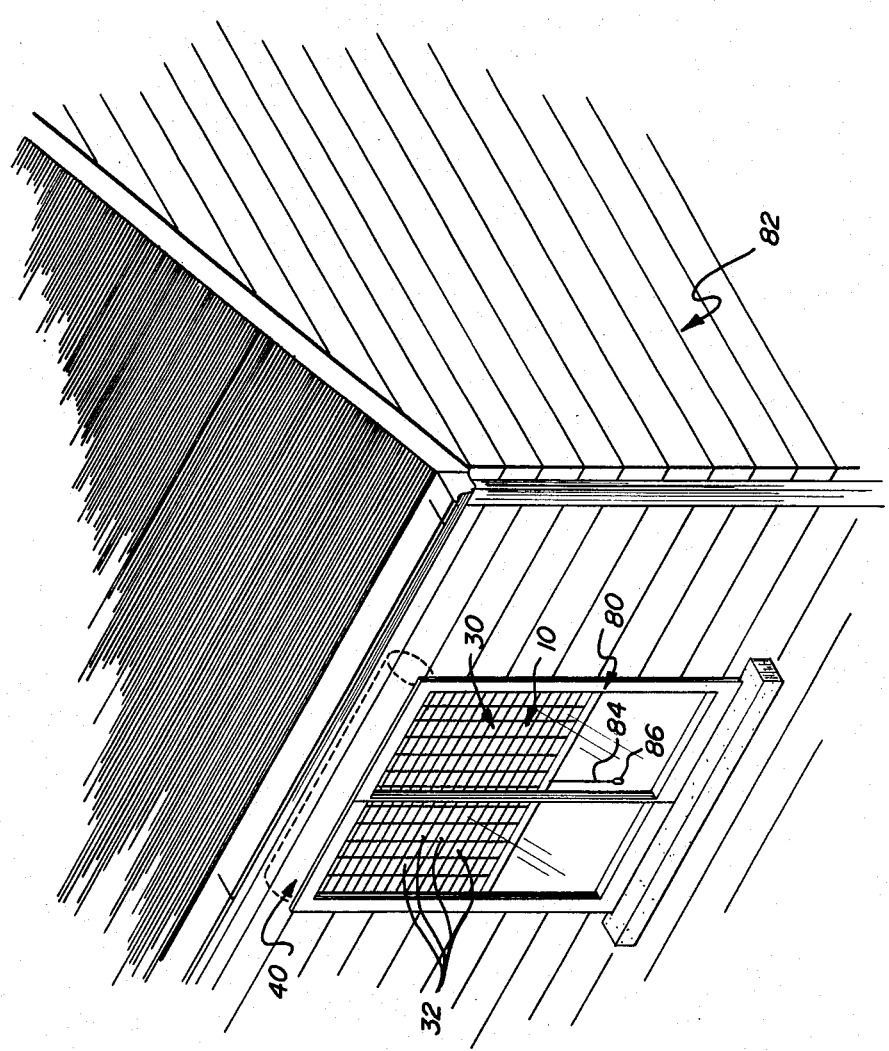
FIG. 4 is an enlarged perspective view of a second preferred embodiment of the retractable power supply assembly of the instant invention, said assembly operatively deployed as a shade for covering the window opening of a residential building.

FIGS. 2-4 all depict a large area solar cell 10, preferably formed with an ultra-thin, ultralight, substantially defect-free substrate 11 which substrate is fabricated in accordance with the principles set forth in the previously cited patent. However, note that the electroformed substrate 11 described in said patent merely represents one preferred embodiment. Other flexible, ultra-thin and ultralight substrates can be formed, such as by etching away some material of a relatively thick stainless steel substrate. These other substrates can then be employed to form thin, flexible, lightweight solar cells without departing from the spirit or scope of the instant invention. Regardless of the manner in which the substrate 11 is formed, immediately there atop, the semiconductor body is deposited from a plurality of superposed layers of p-i-n semiconductor alloy material depicted and described with reference to FIG. 1. The upper electrode 22 is deposited immediately upon and extending generally coextensively with the semiconductor body, which electrode 22 is preferably transparent and formed of a transparent conductive oxide material, such as indium tin oxide.

It may be desirable to rigidify the solar cell 10 to facilitate handling and increase the durability thereof (note that the total thickness of the solar cell 10, including the substrate 11, is only on the order of 2 mils). While the thinner the substrate is fabricated, the greater the savings in terms of weight and cost, and the easier the subdivision of that large area solar cell into small area segments; such ultra-thin, ultralight substrates provide neither sufficient rigidity nor dimensional stability to the solar cells formed thereupon to make the cells resistant to damage caused by sharp bending, wrinkling and abrasion which they could encounter during some types of installation and use. Accordingly, when necessary, a dimensionally stable insulating support member may be advantageously affixed to the surface of the substrate opposite the surface upon which the deposition of semiconductor material occurs. Such a rigidified solar cell 10 may be readily subdivided into a plurality of discrete small area segments 32 for (1) special power generating applications, (2) simply improving the efficiency of current collection, or (3) providing a preselected array of series, parallel or series/parallel, electrically interconnected, small area segments.

Referring now to FIGS. 2-4, the large area solar cell 10 is divided into a plurality of electrically isolated small area photovoltaic segments 32, each segment including layers of semiconductor alloy material and a transport electrode. The small area segments 32 are disposed upon a common electrically conducting substrate 11, with or without an electrically insulating support member, discussed hereinabove. The electrically isolated small area photovoltaic segments 32 may be formed by any scribing process well known to those skilled in the art, such as chemical etching, laser scribing, water jet scribing, plasma etching and the like. It will be noted that the small area segments 32 all share a common electrically conductive substrate 11, and may therefore be electrically connected into a parallel array by techniques such as those disclosed in U.S. Pat. No. 4,419,530 of Prem Nath, entitled IMPROVED SOLAR CELL AND METHOD FOR PRODUCING SAME, which is assigned to the assignee of the instant invention and the disclosure of which is incorporated herein by reference.

In those cases in which the small area segments are formed on an electrically insulating support member, the portions of the electroplated substrate material 11 between the scribed small area segments 32 of the semiconductor alloy material may be readily removed by processes such as the aforementioned chemical etching, laser scribing, plasma etching, or water jet scribing so as to electrically isolate said small area segments and facilitate the electrical interconnection thereof. For example, by interconnecting the bottom metallic substrate 11 of a given small area segment to the top electrode 22 of an adjacent small area segment, a series connection of the two adjacent small area segments may be established. Likewise, electrical interconnection of the bottom substrate electrodes 11 of adjacent small area segments, and electrical interconnection of the top electrodes 22 of those same small area segments establishes a parallel electrical interconnection. Obviously, a wide variety of series, parallel, or mixed series-parallel electrical interconnections may be established. For example, a mixed series-parallel connected array may be readily established in the manner disclosed in U.S. Pat. No. 4,514,579 entitled IMPROVED LARGE AREA PHOTOVOLTAIC CELL AND METHOD FOR PRODUCING SAME, which patent is assigned to the assignee of the instant application and the disclosure of which is incorporated herein by reference.

By utilizing the ultra-thin substrate disclosed in previously discussed U.S. Pat. No. 4,530,739, it is possible to fabricate a high quality substrate having a substantially defect-free surface which is particularly well adapted for the deposition of thin film semiconductor devices thereupon. As disclosed therein, the substrate material is produced in a low cost, rapid, roll-to-roll process in which the texture of the deposition surface thereof may be readily controlled so as to provide for specular or diffuse light reflection therefrom. Additionally, the thickness of the substrate may be controlled so as to facilitate the scribing thereof for the subdivision of large area semiconductor devices into small area segments in the manner described hereinabove.

In a preferred embodiment, the large area solar cell 10 should be at least a foot in length and a foot in width so that, assuming an operational efficiency of approximately seven percent, the unfurled one square foot module is capable of delivering over five watts of power. The most noteworthy feature of such a large area solar cell 10 is that the five plus watts of power is delivered from an approximately 2 mil thick, approximately one-half ounce in weight, flexible sheet of material. In the embodiments illustrated in FIGS. 2-4, following the deposition of the semiconductor alloy material, the deposition of the ITO layer, and the application of a grid, both sides of the large area solar cell 10 are laminated with a thin (approximately 1.5 mil thick), flexible, transparent layer of a synthetic plastic resin such as TEDLAR (registered trademark of the Dupont Corporation).

Specifically viewing the embodiment of the instant invention illustrated in FIGS. 2-3, the flexible, ultrathin, ultralight, elongated, large area solar cell 10 has the opposed, longitudinal, peripheral edges thereof rigidified by thin, elongated, tape-like, spring strips 34. It is to be noted that the strips 34 form an important feature of the instant invention, the importance of which is not to be underestimated. The strips 34 have a gentle curvature (in transverse cross-section) when the strips are disposed in an unfurled condition, which curvature provides rigidity to the solar cell 10. However, the elongated strips 34 become generally planar (in transverse cross-section) when the strips are disposed in a wound-up condition. The strips 34 are affixed to said opposed longitudinal edges so that the solar cell 10 will maintain a substantially planar attitude when said solar cell 10 is fully unfurled and operatively directed so as to capture the maximum amount of incident solar radiation. Also, as is well known, the strips 34 may be operatively connected to one or more springs disposed within the base member 40, which springs facilitate the retraction of the solar cell 10 into the base member 40. While the tape-like strips 34 are preferably formed of a metallic material, other rollable, rigidifying materials such as plastic could also be employed. Further, the unattached, transversely extending, peripheral edge of solar cell 10 is covered by a sleeve 36 formed from a metallic, plastic, leather-like or other like material. The sleeve 36 is adapted to provide (1) transverse rigidification of the solar cell 10 as well as (2) a rigid surface which can be used to hang the solar cell 10 from a wall or other such support. To effect the latter objective of hanging said solar cell 10, said sleeve 36 includes one or more holes or snaps 38 (or a Velcro strip) formed therethrough or affixed thereto. Note that it has been said that the solar cell 10 may hang from the sleeve 36. However, it is preferred that the solar cell 10 be rollably supported by the base member 40 as described hereinafter with respect to FIG. 4.

The elongated, large area solar cell 10 has the remaining transversely extending, peripheral edge thereof (the edge opposite the edge to which the sleeve 36 is attached) retractably affixed within the base member 40 of the power supply 30. The base member 40 is preferably configured as a hollow cylindrical canister 43 which includes an interiorly disposed, hollow, cylindrically-shaped tube 42 for storing one or more series connected batteries (the term "battery" is used herein in its broadest sense to connote one or a plurality of galvanic cells 41. The negative terminal of the last of a plurality of batteries 41 is connected via a metal plate 41a to a negative lead 41b extending therefrom. Likewise, the positive terminal of the first of the plurality of batteries 41 is connected via a metal plate 41c to a positive lead 41d extending therefrom. The positive and negative leads 41b and 41d, respectively, are then connected interiorly of the base member 40 to a receptacle 48a adapted to receive a jack 60 which, in turn, is connected, via an external lead wire 62 to the positive and negative terminals 62a and 62b, respectively, of a power-needy appliance such as radio 64. The hollow canister 43 may also preferably include therein (1) an inverter for converting the direct current generated by the solar cell 10 to alternating current (when necessary) and/or (2) one or more diodes for preventing leakage of current during those periods to time when the solar cell 10 is employed to trickle charge the batteries 41. Note that the charging and inverting circuitry is well known in the art and therefore is not further detailed herein..

In the illustrated embodiment of FIGS. 2-3, the base member 40 of the power supply 30 includes an upraised flange 40a for retractably receiving (without "kinking") the peripheral, transverse edge (the edge opposite the sleeved edge 36) of the large area solar cell 10 so that said elongated, flexible solar cell 10 may either be wound about the interiorly disposed cylindrical tube 42 when the solar cell 10 is in a stored or transport condition, or unfurled from that cylindrical tube 42 when the solar cell 10 is in an operative condition for receiving incident radiation.

Adjacent the external periphery, preferably adjacent the opposed edges, of the hollow canister 43 are (1) a plurality of circumferentially spaced detents 40b, which engage with matching detents 57 on the support frame 50, for positioning the unfurled solar cell 10 at a selectable angle relative to the incident solar radiation such as 99 (see FIG. 3) and (2) elongated, circumferentially extending slots 57a for limiting rotation of the hollow canister 43 within the support frame 50 to approximately 90°. The open end (the right hand end in FIG. 2) of the hollow tube 42 is sealed by an end ring 44 which includes an inwardly extending flange 44a press-fit over and cemented to the open end of the hollow tube 42. The end ring 44 also includes an outwardly extending flange 44b having internal threads 44c for being matingly connected with an end plug 48 as described hereinafter. Obviously, the closed end (the end of the hollow tube not visible in FIG. 2) does not require an end ring. Note that the metal plate 41a for that left hand end of the hollow tube 42 is shown as being deployed exteriorly of the tube 42 for purposes of illustration, when in actuality, it is operatively disposed within the hollow tube 42 and in electrical contact with the negative terminal of the first battery 41. The opposed ends of the base member 40 are then closed by press-fitting the inwardly directed flanges 46a of the apertured pear-shaped seals 46 into the interior of the base member 40. The aperture of the right hand seal 46 is sized to fit over the outwardly extending flange 44b of the end ring 44. Finally, an end plug 48 is threaded at 48b for matingly engaging the corresponding internally threaded flange 44c of the right hand end ring 44. The left hand seal 46 includes an integral end plate 46b so as to close the left hand end of the base member when the flange 46a thereof is secured to that left hand and of the base member 40. The end plug 48 also has a central aperature 48a formed therethrough for receiving the external jack 60 and connecting that jack 60 to the positive and negative leads 41b and 41d, respectively, of the batteries 41; the jack allowing for rotatable electrical contact between the batteries 41 and an external load.

The final component of the retractable power supply 30 of the instant invention is the support frame 50, which frame is configured, sized and designed to rotatably support the base member 40. To that end, the support frame 50 includes a substantially rectangularly shaped base 52 upon which a partial cylinder 54 is either integrally formed or discretely formed and secured thereto. The partial cylinder 54 is adapted to rotatably receive the hollow canister 43 of the power supply 30. More particularly, the internal circumference of the partial cylinder 54 and the external circumference of the hollow canister 43 are similarly sized so that said canister 43 can be rotatably supported therein (after the canister 43 is snap-fit though the flexible cylindrically-shaped springs 54a formed at the opposed ends of the support frame 50). By rotatably supporting the hollow tube 42, said canister 43 could alternatively have the flexible solar cell 10 wound about the external periphery thereof without departing from the spirit or scope of the instant invention. Finally, the internal peripheral surface of the partial cylinder 54 includes at least one lug 57 at each of the opposed ends thereof, which lugs 57 correspond in shape, size and location to the slots 57a formed on the opposed ends of the hollow canister 43.

Turning now specifically to FIG. 3, the retractable power supply 30 of the instant invention is shown operatively disposed relative to the source of incident solar radiation 99. It should be noted that the purpose of said illustration is to demonstrate that: (1) the rigidifying metal strips 34 affixed to the longitudinal edges of the elongated solar cell 10 are adapted to hold said solar cell 10 in a substantially planar condition when unfurled and directed toward the source of illumination; (2) by simply rotating the base member 40 within the support frame 50 until the correspondingly shaped detents 56 on the internal surface of the partial cylinder 54 of the support frame 50 and 40b of the base member 40 are orientated and locked into place, the solar cell 10 is held at an optimum angle for receiving the maximum intensity of the incident solar radiation 99; and, (3) the external jack 60 is adapted to readily couple the electrical energy generated by the portable, retractable power supply 30 to a power needy appliance such as radio 64.

Finally, and with specific reference to FIG. 4, a further embodiment of the invention is illustrated, an embodiment in which the retractable power supply 30 is used as a window shade so as to accomplish the double function of generating electrical energy and covering a window 80 of a residential dwelling 82. When employed as a window shade, the support frame 50 thereof is rotatably affixed to the upper casement of the window opening 80, by means of clips, screws Velcro brand separable hook and loop fastener or the like. A cord 84 having a ring pull 86 at the end thereof is secured to the holes 38, formed through the sleeve 36 of the solar cell 10, said cord 84 providing for unfurling and rewinding of the solar cell 10. When in said unfurled, generally planar condition, the retractable solar cell assembly 30 functions as a solar powered window shade 80, said shade adapted to generate electrical energy from incident radiation, transmit that electrical energy to rechargeable batteries 41 stored within the hollow tube 42 of the base member 40 to which the solar cell 10 is retractably affixed, and couple that electrical energy, via the external jack 60, to a power needy appliance.

Finally, it should be noted that the periphery of the outwardly directed flange 44b of the end ring 44 is knurled, or otherwise textured, to provide a surface having a sufficient coefficient of friction to aid in gripping and rotation. This is because the solar cell 10 may be wound and unwound from the power supply 30 by rotation of the hollow tube 42 relative to the stationary base member 40.

It should be understood that the present invention is not limited to the precise structure of the illustrated embodiments. It is intended that the foregoing description of the presently preferred embodiments be regarded as an illustration rather than as a limitation of the present invention. It is the claims which follow, including all equivalents, which are intended to define the scope of this invention.

What is claimed is:

1. A retractable power supply comprising:
    a thin, flexible, lightweight, large area solar cell for converting incident light energy into electrical energy;
    a base member for storing the solar cell, said solar cell rollably secured to said base member;
    a thin, rollable, elongated, tape-like, rigidifying spring strip affixed to the solar cell and oriented generally perpendicular to the base member, said strip having a curved cross-sectional shape taken in a direction transverse to the longitudinal direction thereof when the solar cell is deployed from the base member, and of a generally planar cross-section in said transverse direction when the solar cell is rollably secured, said strip operative to rigidify the deployed solar cell; and,
    terminal means for withdrawing electrical energy from the power supply.

2. A supply as in claim 1, wherein the base member is a hollow canister about which the solar cell may be retractably wound and from which the solar cell may be unfurled.

3. A supply as in claim 1, wherein the base member is a hollow canister into which the solar cell may be retracted and from which the solar cell may be unfurled.

4. A supply as in claim 1 including two rigidifying strips, each disposed along the opposed, longitudinal, peripheral edges of the solar cell.

5. A supply as in claim 4, further including a sleeve covering the peripheral border of the transverse edge of the solar cell not secured to the base member.

6. A supply as in claim 5, wherein the sleeve includes means for fastening the power supply to a support surface so as to hang said power supply therefrom.

7. A supply as in claim 5, wherein the fastening means on the sleeve includes at least one snap, at least one aperture, or at least one Velcro brand hook and loop fastener strip for hanging the power supply.

8. A supply as in claim 1, wherein the base member is a hollow canister; and the supply further includes at least one battery stored within said canister.

9. A supply as in claim 8, wherein the at least one battery is rechargeable; and the supply further includes means providing for the recharging of said at least one battery by the solar cell.

10. A supply as in claim 8, wherein the hollow canister further includes an a.c.-d.c. inverter and diode means for limiting the flow of electrical current in the direction of the battery pack when recharging the power supply.

11. A supply as in claim 1, further including a support frame for rotatably supporting the base member.

12. A supply as in claim 11, wherein the support frame is shaped as a partial cylinder and the base member is a cylindrically shaped canister adapted to be rotatably received therein.

13. A supply as in claim 11, wherein the periphery of the canister and the interior cylindrically shaped surface of the support frame includes a plurality of correspondingly shaped detents for positioning the unfurled solar cell at a given angle relative to the incident solar radiation.

14. A supply as in claim 13, wherein the periphery of the canister has at least one 90° slot formed therein and the interior cylindrically shaped surface of the support frame includes a correspondingly shaped lug for reception thereinto, whereby rotational and side-to-side movement of the canister is limited.

15. A supply as in claim 1, wherein the terminal means are positive and negative terminals, said terminals being accessibly disposed.

16. A supply as in claim 1, further including means for securing the base member to a wall, whereby the supply may function as both a source of electrical energy and a retractable shade when operatively deployed to cover a window.

* * * * *